US008607044B2

(12) United States Patent
Hallam-Baker

(10) Patent No.: US 8,607,044 B2
(45) Date of Patent: Dec. 10, 2013

(54) PRIVACY ENHANCED IDENTITY SCHEME USING AN UN-LINKABLE IDENTIFIER

(75) Inventor: Philip Martin Hallam-Baker, Medford, MA (US)

(73) Assignee: Verisign, Inc., Reston, VA (US)

( * ) Notice: Subject to any disclaimer, the term of this patent is extended or adjusted under 35 U.S.C. 154(b) by 1305 days.

(21) Appl. No.: 11/701,564

(22) Filed: Feb. 2, 2007

(65) Prior Publication Data

US 2007/0250704 A1    Oct. 25, 2007

Related U.S. Application Data

(60) Provisional application No. 60/794,516, filed on Apr. 25, 2006.

(51) Int. Cl.
*H04L 29/06* (2006.01)

(52) U.S. Cl.
USPC .......................................................... 713/156

(58) Field of Classification Search
USPC .......................................................... 713/156
See application file for complete search history.

(56) References Cited

U.S. PATENT DOCUMENTS

| 2004/0030932 | A1* | 2/2004 | Juels et al. ............... | 713/202 |
|---|---|---|---|---|
| 2004/0177061 | A1 | 9/2004 | Xu et al. | |
| 2006/0177061 | A1* | 8/2006 | Orsini et al. ............ | 380/268 |

FOREIGN PATENT DOCUMENTS

| JP | 2005167670 | 6/2005 |
|---|---|---|
| JP | 2005352815 | 12/2005 |
| JP | 200531330 | 2/2006 |
| WO | 2005031579 | 4/2005 |

OTHER PUBLICATIONS

International Search Report, issued in related International Application No. PCT/US07/09353, mailed on Jun. 16, 2008.
Nohara et al, "Toward unlinkable ID Management for Multi-sentice Environments" PerCom 2005 Workshops. Available from the internet via: htt://ieeexplore.ieee. org/iel5/9593/30313/01392813.pdf.
Weis et al, "Security Privacy Aspects of Low-Cost Frequency Identification Systems" International Conference on Security in Pervasive Computing 2003, LNCS 2802, pp. 201-212, 2004.
GB Examination Report corresponding to the GB0707939.5 application dated Aug. 13, 2010.
Han et al., "RFID Systems—Security Problems in Existing Protocols," Proceedings of the Symposium on Cryptography and Information Security 2006 (SCIS2006). Jan. 17, 2006, 2F2-4.
Sakai et al., "A Study on an Anti-Tracking RFID Tag System," Report of the Information Processing Society of Japan, Information Processing Society of Japan Foundation, Jul. 22, 2005, vol. 2005, No. 70, pp. 437-442.
Japanese Office Action dispatched Sep. 11, 2005, of corresponding Japanese Application No. 2009-507722 filed Oct. 24, 2008.

* cited by examiner

*Primary Examiner* — William Powers
*Assistant Examiner* — Dant Shaifer Harriman
(74) *Attorney, Agent, or Firm* — MH2 Technology Law Group LLP

(57) ABSTRACT

A privacy enhanced identity scheme that may use public and private key cryptography to selectively distribute attributes of a token holder to a relying party. A challenge message {Rnonce, RID}, where Rnonce is a reader nonce and RID is a reader identifier. Methods may also include, responsive to the challenge message, sending a response message including at least an encrypted private token identifier TID and a session key k. In response to a challenge from a reader. The token sends a message that includes token identifier that is un-linkable to other identifiers sent from the same token.

20 Claims, 5 Drawing Sheets

PRIVACY ENHANCED IDENTITY SCHEME USING AN UN-LINKABLE IDENTIFIER

CROSS-REFERENCE TO RELATED APPLICATIONS

This application claims the benefit of U.S. Provisional Application No. 60/794,516, filed Apr. 25, 2006, under 35 U.S.C. 119(e), the entire contents of which are hereby incorporated by reference.

FIELD OF THE INVENTION

The present invention generally relates to a privacy enhanced identity scheme. More specifically, the present invention relates to a privacy enhanced identity scheme using public and private key cryptography to selectively distribute attributes of a token holder to a relying party.

BACKGROUND

Many countries are discussing the possibility of using a national identity card scheme. For example, the United Kingdom recently announced plans to introduce a British national identity card scheme. The British national identity card scheme will be linked to a national identity database. The national identity database is planned to perform a key role in the delivery of Government services. Within the next decade, the United Kingdom anticipates that up to about eighty-percent of the working population will have some form of British national identity card. The United Kingdom plans for the compulsory entry of information into the national identity database in return for government services. For example, a person's personal identification information would be automatically added to the national identity database when obtaining a passport or drivers' license.

An aspect of the British national identity card scheme may be a centralized computer database called the British national identity registry. To identify someone under the scheme, it may be necessary to check the British national identity card, such as by taking a biometric scan and matching it against the British national identity registry.

The British national identity registry is planned to record and store a variety of information, including, for example, personal information, identifying information, residential status, personal reference numbers, record history, registration and ID card history, validation information, and security information.

Consequently, due to the amount and type of information stored in the British identity database, the British national identity card scheme has led to much debate over privacy and security concerns.

In some traditional identity schemes, such as those used in the United States for age verification, authorization may typically be performed in two stages. First, the identity of the subject is authenticated by using a photograph. Second, an attribute, such as an age or a name, which is bound to the identity, is evaluated.

In the food and beverage industry, drivers' licenses are commonly presented to a relying party to verify that a patron is twenty-one years of age. However, in addition to verifying age, a number of establishments also capture information encoded on the magnetic stripe of the drivers' license. For example, for marketing purposes, the address and social security number of the license holder are often recorded, or, the information is often stored to track consumer behavioral patterns.

Therefore, in order for a person to prove they are over twenty-one, they must expose every other piece of information provided on the magnetic strip of the license. Many consider the use of this information unauthorized and an invasion of privacy.

Similar privacy concerns arise regarding a national identity card scheme. For instance, the national identity card scheme may not only record a person's biometric features, but, most likely will also record a personal history. As a result, when a civil servant accesses the database and searches files on a persons taxes or health, the civil servant may also have access to the individual's criminal history. Therefore, providing limited access to the identity database may be advantageous in order to mitigate privacy concerns.

Still other are concerned with security, and in particular, identity theft. Some security experts have argued that entrusting a single identity card or database may facilitate identity theft.

Existing privacy enhancement schemes are designed to provide relatively strong guarantees of privacy against all parties. Such schemes are not appropriate for a national identity card scheme where it may be desirable to control linkage so that a card can only be used for authorized purposes.

To address these concerns, in accord with the embodiments of the present invention, a privacy enhanced identity scheme using an un-linkable identifier, such as for use with a national identity card, is disclosed which may allow the holder to provide the relatively exact degree of information authorized and necessary to relying parties such as the police, government agencies and authorized third parties to reduce privacy and security concerns.

DESCRIPTION OF THE DRAWINGS

Referring to the drawings which form a part of this disclosure.

DETAILED DESCRIPTION

Figure 1:
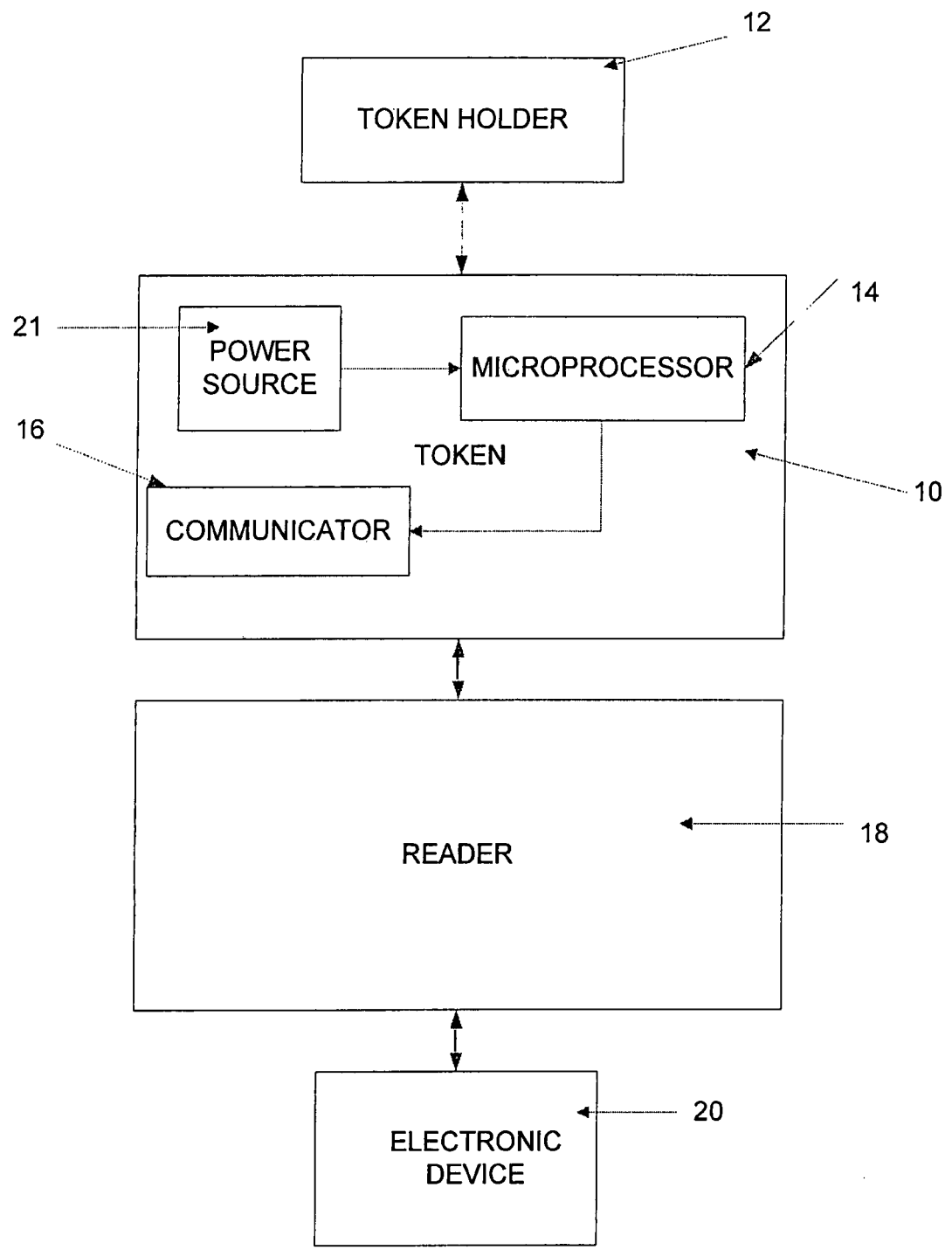
FIG. 1 shows a token and a reader that may be employed in accordance with embodiments of the present invention.

The present invention generally relates to a privacy enhanced identity scheme using a token, such as a national identity card. A relying party (such as a merchant) can have a token reader and can interact with a token and a identity registry. The merchant can interact with the token and the registry to obtain only a subset of the information stored at the registry about the token holder. For example, a restaurant (the relying party) can interact with the token and registry to verify that the token holder is over 18 years of age, and can be served alcohol. No other information about the token holder is disclosed to the restaurant, thereby protecting the privacy of the holder's other information that is stored at the registry.

A method in accordance with embodiments of the present invention can use public and private key cryptography to selectively distribute attributes of a token holder to a relying party. The method can include creating a challenge at a reader having a reader identifier (RID) by calculating C={RID, Rnonce}, where Rnonce is a reader nonce. The challenge can be sent to the token. The token can generate a response, for example, {signature (H(Tnonce, Rnonce, RID)), Tnonce, XID}, where Tnonce is a token nonce and H is a hash function. XID is an un-linkable identifier of token, for instance, XID={E (k, P), E (TID, k)}, where TID is a token identifier, k is a session key, P is a public key of the registry, E(TID, k) is the TID encrypted function using session key k and E(k,p) is the session key k encrypted using public key P.

In accordance with embodiments of the present invention, a privacy enhanced identity scheme using an un-linkable identifier, such as for use with a national identity card, may allow the holder to provide a more accurate degree of information authorized and necessary to relying parties such as the police, government agencies and authorized third parties, while mitigating privacy and security concerns.

Embodiments of the present invention may allow for the ability to control third party use of the scheme. For example, the government can permit uses such as age verification in bars to a relying party without providing unrelated information. It may also be possible for the users, such as the government, to allow or disallow the use for particular parties, and it may be possible for a grant of use to be revoked. For example, an early implementation of the scheme may allow a relying party to use the scheme for age verification in certain bars where there has been a problem of underage drinking. Moreover, the scheme may also allow a user to prevent the use of a particular card if the card is reported stolen. Furthermore, in an instance where, for example, the drinking age was changed from 21 to 18, the scheme may be adjusted at the national level.

Methods in accordance with embodiments of the invention may also be used, for example, to introduce temporary rationing measures or disaster relief aid. In the case of a fuel shortage, the government may wish to institute a short term rationing scheme to limit purchases of fuel per day. In this case, the token holder may be a citizen in a disaster area and the token may be a national identity card linked with a national identity registry. The relying party may be fuel stations. The government, in this instance, may at least temporarily set-up an fuel distribution attribute registry linked to the national identity registry to maintain a record of drivers and the amount of fuel purchased by each. The token holder or relying party may be granted access to fuel supplies in proportion to a predetermined number of purchases by the token holder or the amount of fuel sold by each station. In contrast to conventional rationing schemes, this method may be employed more expeditiously in response to short term disasters.

Methods in accordance with embodiments of the invention may also be used, for example, in the healthcare industry. For example, it is possible that there could be no intake forms when you visit a doctor, all of the information could be maintained in a central database. The patient may have a token. So, for instance, if a patient were allergic to sulfa based drugs, this information could be listed in the central database. Therefore, authorized health care personnel may have access to these records through the database as a relying party even though the patient has not filled out an intake form.

Referring initially to FIG. 1, a token 10 and token holder 12 are shown. In the example, the token 10 has a embedded microprocessor 14 and a token communication means 16. Also shown in FIG. 1 is a reader 18 having a an electronic device 20 attached.

The token communicator 16 may include any suitable standard card pin array, USB connector, RFID wireless arrangement, BLUETOOTH™, WiFi, or combinations thereof which are suitable for conveying a message from and/or to token microprocessor 14.

The token 10 may include a power source 21 (e.g., batteries, antenna in the case of an RFID, etc.) which can be charged by the reader 18. The token 10 may communicate with the reader 18 via contact or may be contact-less. The token 10 may be any hardware device that remembers the keys of a source with which interaction may be desired, for example, an identity registry database in a national identity card scheme. The token 10 may be any smart card, key fob, the embedded function of a portable wireless device such as a cellphone, any embedded function implanted into a token holder, or an RFID tag.

For example, the token may be a means of identifying property. Therefore, a small RFID token with an identity capability may be installed in a car VIN tag or any other suitable place on a car, e.g., in a hidden place. Therefore, a law enforcement official may be able to review the tag with a scanner device to investigate whether the vehicle is for example, stolen and/or the tax status of the vehicle.

In addition, with respect to RFID type tags, conventional tags use linkable identifiers. Therefore, RFID type tags often use a very weak radio signal that can be read from only short distances. This limits privacy concerns but greatly increases the practical difficulty of using the system. Using the unlinkable identifier, as discussed hereinafter, the need to depend on close proximity to avoid privacy violations may be addressed, and the range of RFID type tags may be extended.

The token 10 may also have any integrated means of authenticating the token holder 12. For example, biometric authentication may be used using a variety of techniques. For instance, fingerprints, iris/retina scans, voice, handwriting, dental imprints, DNA information, handwriting, and combinations thereof may be used.

The token 10 may be blank or have printed information thereon. Additionally, the token 10 may include other identifying characteristics of the token holder 12 in machine readable or non-readable form.

The token 10 may have different physical form factors. The token may be a card conforming to the internationally agreed credit form factor and/or RFID tag standards. For example, the International Standards Organization defines three formats for identity or identification cards in ISO 7810, ID-1, ID-2, and ID-3.

For example, the ID-1 format specifies a size of 85.60× 53.98 mm, equal to 3.370×2.125 in. It is commonly used for banking cards, such as ATM cards, credit cards, debit cards, etc. It is today also used for driving licenses in many countries, for instance, the United States and member nations of the European Union. This standard may also be used for retail loyalty cards and is one fairly common format for business cards.

Additionally, ISO 7813 defines characteristics of ID-1 plastic banking cards, for example, a thickness of 0.76 mm and corners rounded with a radius of 3.18 mm.

ISO 7811 defines traditional techniques for recording data on ID-1 identification cards, namely embossed characters and several different magnetic recording formats. ISO 7816 defines ID-1 identification cards with an embedded chip, such as smart cards and contact surfaces for power, clock, reset and serial-data signals.

The ID-2 format specifies a size of 105×74 mm, equal to 4.134×2.913 in. The ID-2 format may provide enough space for a facial photo, but may be still small enough to be carried in a wallet.

ID-3 specifies a size of 125×88 mm, equal to 4.921×3.465 in. This format may be used worldwide for passports and visas.

Furthermore, ISO 14443 defines identification cards with an embedded chip (proximity card) and a magnetic loop antenna that may operate at about 13.56 MHz, such as for RFID.

As described herein above, the token may take a form conforming any of the internationally agreed credit form factor and/or RFID tag standards, and may also include combinations and suitable alternatives thereof. The token may also be any suitable dimensions and/or shapes.

Multiple tokens 10 may be used per token holder 12. In other words, there is no limit on the number of physical tokens 10 that a token holder 12 can possess, be issued, or obtain. This may allow the token holder 12 to obtain duplicate tokens 10 for use in case of malfunctions and/or lost tokens 10.

The token 10 may also be implantable, such as within humans, animals, merchandise, etc.

The reader 18 may be any hardware device that reads data from a source with which it wishes to interact. In other words, the reader 18 may be any device that can read data stored on the token 12 or, for example, in a identity registry. The reader 18 may plug and/or be directly connected to a computer, keyboards, cell phones, PDA's, wireless device, and other suitable electronic devices. Furthermore, some financial and government entities, such as the FBI, may also require special types of secure readers.

Figure 2A:
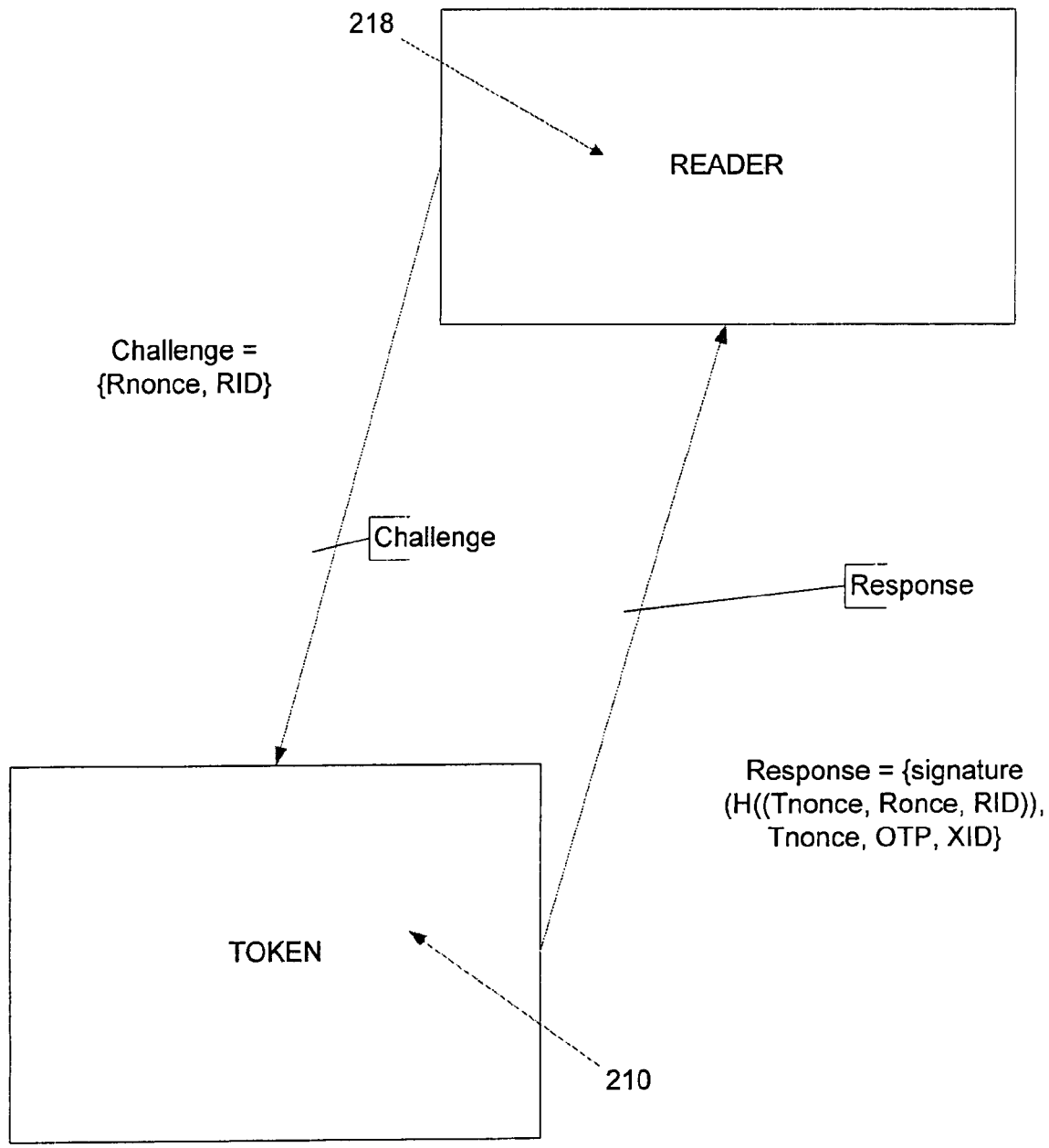
FIG. 2a shows the reader of FIG. 1 generating a challenge and the token of FIG. 1 generating a response.
Figure 2B:
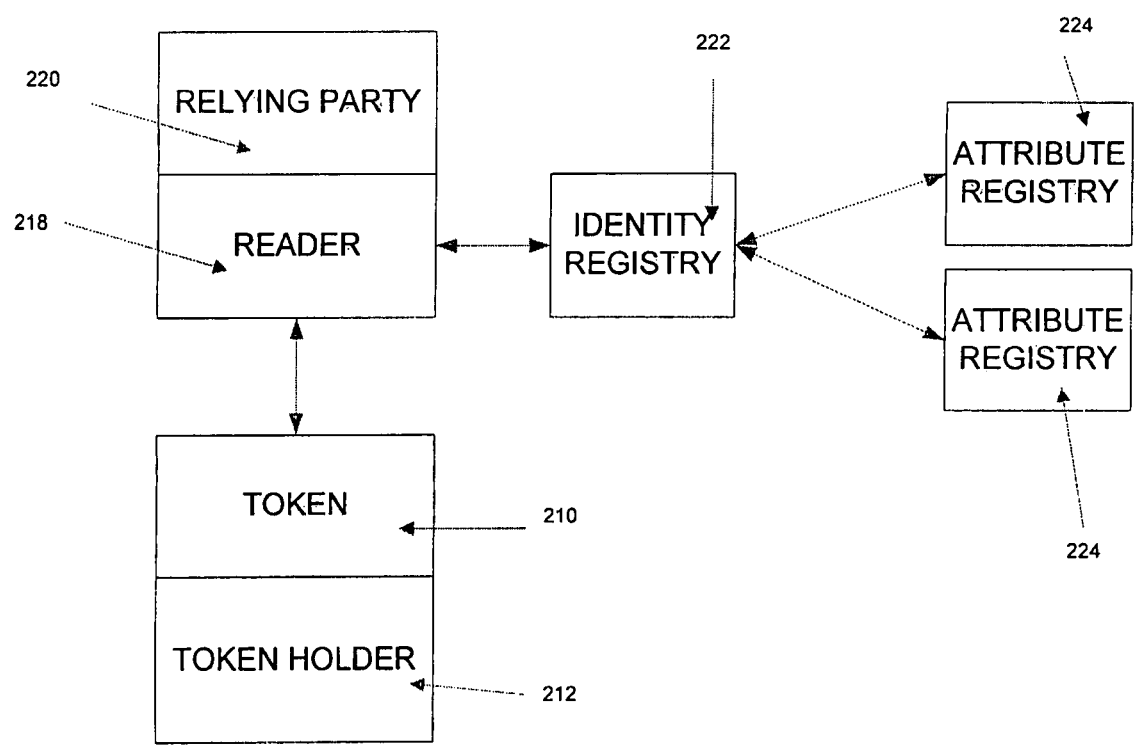
FIG. 2b shows a block diagram of a token, a token holder, a party, a relying party reader, an identity registry, and a plurality of registries that may be employed in accordance with embodiments of the invention.

As shown generally in FIGS. 2a and 2b, in a privacy enhanced identity scheme that may be employed in accord with an embodiment of the present invention, a token holder 212 may present a token 210 to a reader 218 of a relying party 220. The reader 218 may interact with the token 210, through one or more challenges and responses. The reader 218 may then request for an attribute or attributes from an attribute registry 224 associated with the identity registry 222. The identity registry 222 may then verify if the relying party 220 may be authorized to obtain the requested attribute information. If the relying party 20 is authorized the attribute information may be retrieved from either the identity registry, one or more of the attribute registries 224, or a combination thereof. Then, then a message, which may or may not include the attributes requested, may be returned to the reader 218 of the relying party 220.

For example, it may contemplated that the identity scheme may be used, for example, with customer loyalty cards where the relying party is a merchant and/or vendor and the registry is a manager and/or corporate office of the loyalty scheme. In such an identity scheme, a merchant may offer discounts to customers of a particular club. Consequently, via the registry, the merchant may use the identity scheme to verify that the customer is a member of the club and if the customer is entitled to a discount.

It may also be contemplated that the identity scheme can be used, for example, in an access control system where the relying party is the access control point (e.g., to a building or resources on a computer server) and the registry is an access control authority. For instance, in this scheme, an employee may have a badge that is processed at an access control point. The registry may be used to decide whether the employee can access a particular area based on information received from the badge and access control point.

It may still further be contemplated that the identity scheme may be used in a RFID tag system where the relying party is the component that talks to the RFID reader (e.g., cash register, supply chain control point) and the registry is, for example, a credit card company or supply chain manager. In such a case, the RFID tag could provide TID in the protocols in accordance with embodiments of the present invention. In yet another example, the relying party may be a node in a biometric authentication system. When a customer submits biometric and other identifying information, that information can be sent to a registry for verification. For example, in the above protocol, biometric data from the customer, e.g., a fingerprint, a retinal scan, an iris scan, etc., may be used.

Figure 3A:
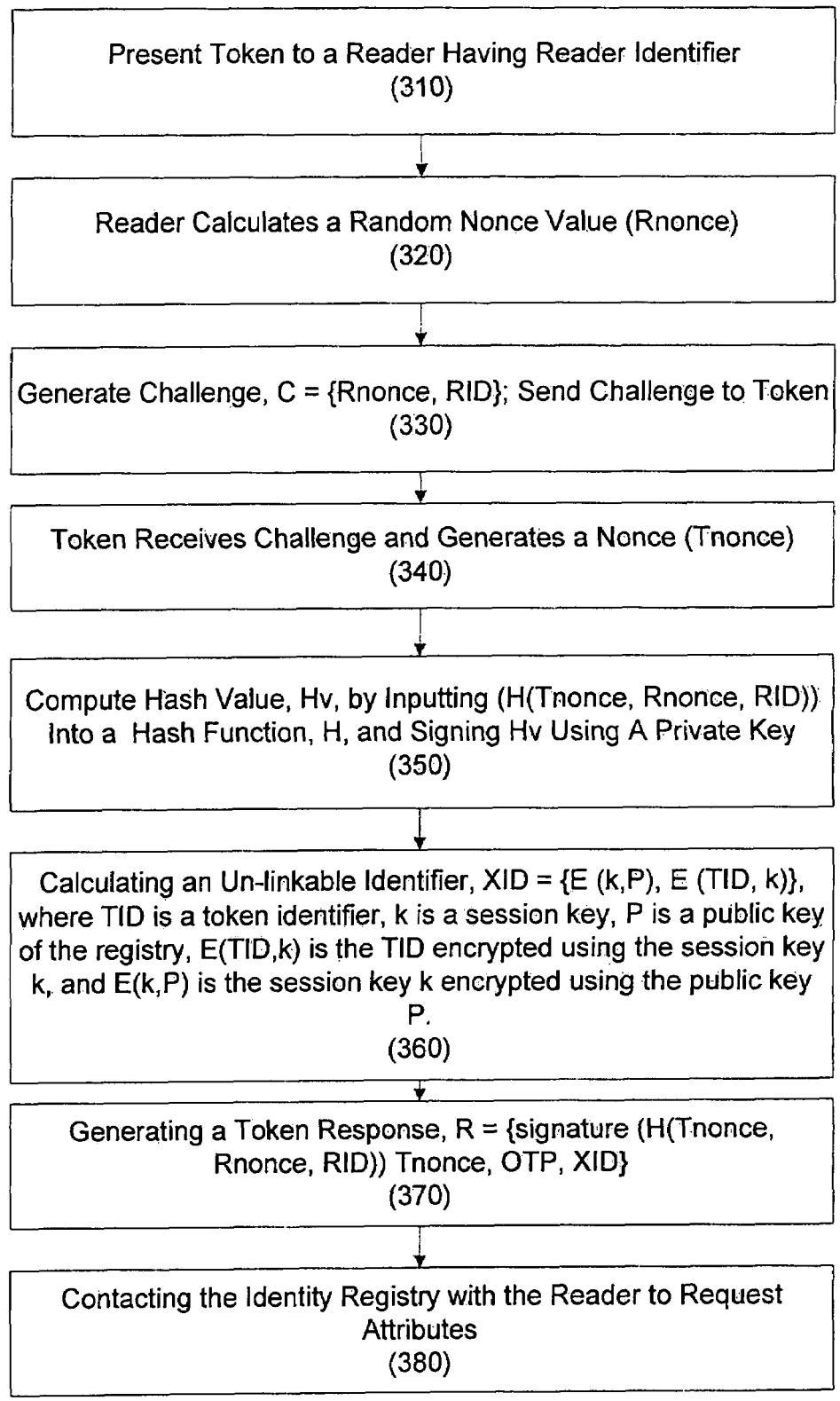
FIG. 3a shows a method of using public and private key cryptography to selectively distribute attributes of a token holder to a relying party.
Figure 3B:
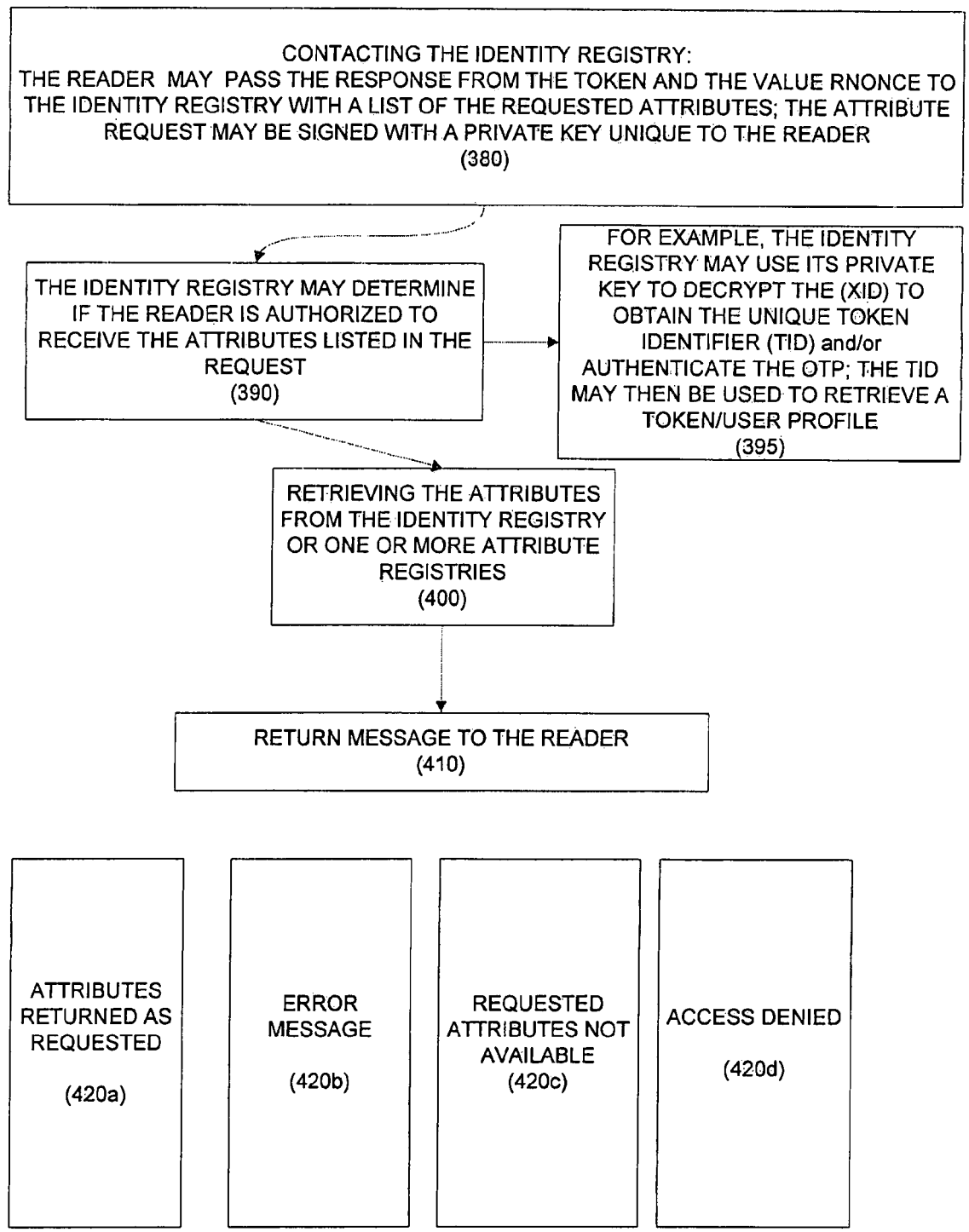
FIG. 3b shows method steps that may employed in accordance with the embodiments of the present invention.

FIGS. 3a and 3b show methods of using public and private key cryptography to selectively distribute attributes of a token holder to a relying party that may be employed in accordance embodiments of the present invention. The methods described and disclosed herein are exemplary, and may also be performed in various sequences, with some or all of the disclosed steps being performed in a different order than described while still remaining within the spirit and scope of the embodiments of the present invention.

In the following steps, asymmetric key operations may be substituted for the private key operations described and vice versa. Furthermore, communications between the token and the reader may be compressed by sending a one-way digest function, or hash, of the DateStamp from the token to the reader rather than the entire date stamp.

As seen in 310, the token holder may present a token to the reader of the relying party. The reader may have a reader identifier (RID). The reader identifier may be a unique identifier for the reader.

The reader may then generate a random nonce value Rnonce 320. Rnonce may be a random value generated by the reader. A counter method may be used for generating the nonce value, however, any suitable source of random or pseudo-random data may be used. For example, the reader may have a true random number generator embedded. In 330, a challenge may then be generated by the readers as follows:

$$\text{Challenge} = \{Rnonce, (RID)\}$$

A date stamp may also be added. The date stamp may be an opaque bit sequence that represents a time value that is verifiable by the identity registry. For example, a signed time value obtained from a trusted source may be included to prove that the challenge was presented to the token within a specified time window. Use of a non-trusted date value may be acceptable in circumstances where reply attacks are not a threat.

The challenge may also incorporate a description of the attribute information that is to be requested from the registry.

The challenge may then be sent to the token by the reader. In 340, the token receives the challenge and generates a nonce of its own, Tnonce.

Tnonce may also be generated using a counter method or can use any suitable source of random or pseudo-random data. For example, the token may have a true random number generator embedded.

In 350, the two nonce values, Tnonce and Rnonce, plus the reader identifier (RID), may then be inputted into a hash function (H). The hash function (H) can produce a value, Hv, that may be computed from a base input number using a hashing algorithm. In other words, the hash value may be a summary of the input number.

The value (Hv) may then be signed using a private key only known to the token.

The Tnonce value and the use of the hash function may provide protection against a class of crypto-analytic attacks known as plaintext attacks. The incorporation of the reader identifier (RID) value into the hash value (Hv) may ensure that the identity registry can determine that the token was used to request an attribute from the specified reader. Additional information may be included in the challenge to prevent similar forms of attack.

At this time, if the public key value was available to the reader, the reader may be able to authenticate the token using conventional cryptographic techniques of reconstructing the hash value. However, the public key should generally not be available to the reader and instead the reader has the un-linkable identifier (XID) value, which will be discussed in more detail below, which may only be interpreted by the identity registry.

Nevertheless, provided that the signature algorithm chosen may be secure, the Rnonce value may be unique, and the private key value may be only known to the token, the signature value can only have been created by the token.

In 360, the un-linkable identifier (XID) may be calculated. For example, the un-linkable identifier may be calculated by encrypting the private serial number or other identifier of the token, (TID), using a session key, which itself can be encrypted using the public encryption key of the identity registry so that a different un-linkable identifier (XID) value may be created every time the token may be presented. A token may contain multiple un-linkable identifiers used for different purposes.

In 370, a token response may be generated. The token response may include the signature value (Hv), the value Tnonce, the un-linkable identifier (XID) to the reader. Therefore, the response may be an opaque and un-linkable response. For instance, the response may be the following:

Response={signature ($H$(Tnonce, Rnonce, RID)), Tnonce, XID} where $XID = \{E(k, P), E(TID, k)\}$

P=The Public encryption key of the registry
TID=The private identifier of the Token
k=A randomly chosen session key
E=encryption of message under key k
E (k, P)=is the session key k encrypted using public key P
E (TID, k)=is the TID encrypted using session key The response may also include a one-time password (OTP) and/or biometric data generated by the token and/or token holder.

Next, as seen in step 380 the token response may then be presented to the identity registry. The reader may pass the response from the token and the value Rnonce to the identity registry together with a list of attributes. The attribute request to the identity registry may be signed using a private key unique to the reader. In step 380, token response may be presented as a reader response. For example, the reader response may be R={Token Response, Rnonce, AttributeList, Authentication Data}, may also include an attribute list and authentication data to allow the registry to determine whether the request should be granted. The attribute list may include attributes (e.g., age, sex, height, allergies, etc.) bound to the identifier that the reader requires. The authentication data may be any information that may facilitate the identity registry in determining whether the request may be granted.

Any suitable presentment protocol may be used. For example, a web services based protocol may be employed such as WS-Security or SAML. The basic protocol may provide for the privacy of the reader if desired.

Turning to FIG. 3b, in 390, the identity registry may determine if the reader is authorized to receive the attributes listed in the request by verifying information such as the signature value {signature ($H$(Tnonce, Rnonce, RID))}, a date stamp value, and/or authentication data such as the OTP and/or biometric data to ensure consistency with expected values with a properly authorized requester.

As seen in 395, the identity registry uses its private key to decrypt the un-linkable identifier (XID) to obtain the unique token identifier (TID). The token identifier (TID) may then be used to retrieve a token profile from a database. The database may contain the public key corresponding to the token and possibly other information such as the name of the token holder, social security number, tax identifier, or other relevant information to verify the request. Alternatively, the same information may be encoded in the token identifier (TID) itself. This arrangement may eliminate the need for the local database.

As seen in step 400, once the identity registry identifies the token, attribute assertions relating to the token holder may be retrieved from one or more attribute registries using any suitable protocol to protect the privacy of the identity registry such as SAML.

In accordance with an embodiment of the present invention, an authorization database can be used to ensure that the reader may only be sent attributes for which it is authorized, so as to protect the privacy of the token holder. For example, if the reader is assigned to a merchant at a bar, the reader may only be authorized to receive the "age" attribute of the token holder. If the reader is a hospital, the reader may be authorized to receive medical information (e.g., age, medical history, current medications, etc.) of the token holder. In any event, the request for token holder information submitted by the reader can be compared to the attribute authorizations for that reader (or type or class of reader), e.g., by the registry. The requested attribute information can be returned to the reader only if the reader has been determined to be authorized to receive it.

As seen in 410, the identity registry may then return a message to the reader which may or may not include the requested attributes.

For example, as seen in 420a, 420b, 420c, and 420d, various messages may be generated by the identity registry in response to an attribute request. It should be understood that the examples of 420a-d are merely exemplary, and many suitable messages may be generated in accordance with embodiments of the present invention. In 420a the attributes may be returned as requested from the identity registry to the reader. As seen in 420b, an error message may be returned from the identity registry to the reader. As seen in 420c a message indicating that the requested attributes are not available may be generated. In 420d a message may be returned denying access from the identity registry to the reader.

The messages generated may cover numerous possibilities, for example, instances in which the token has been reported stolen or missing, a circumstance in which the relying party may be prevented from receiving any information, hardware malfunctions, and instances where authentication succeeded, but, the attribute information is not available.

The national identity database may have one or more separate attribute registries or may not have a separate attribute registry. The national identity database and attribute registries may record, but is not limited to, the following information: personal information; identifying information; residential status; personal reference numbers; record history; registration and ID card history; validation information; security information; and records of provision of information.

Personal information may include full name, other names by which he or she is known, date of birth, place of birth, gender, residences, past places of residences. Identifying information may include head and shoulder photographs, signatures, fingerprints, and other biometric information. Residential status may include nationality, entitlement to remain in the country, and the terms and conditions of leave to enter or remain in the country. Personal reference numbers may include National Identity Registration Number, the number of any ID card issued, any national insurance numbers, the number of any immigration document or passports, drivers license numbers, work permits, or combination of the documents above. The record history may include changes to any of the previously recited information.

The registration and ID card history may include the dates of application, modification, confirmation, omissions, validity, notifications (e.g. lost, stolen, damaged), surrenders, and countersignatures of registration and ID of card.

The actions of the registry may be subject to audit. The operation of the registries may be audited by means of trustworthy hardware. The invention may include measures to facilitate the process of auditing the interaction between the identity registry and attributes registries.

Embodiments of the present invention may encompass other embodiments wherein a token identifier can be encrypted to be opaque to a relying party and linked to the token holder only by a registry. The registry or an authorized party may consult profile information that establishes which data about the token holder the relying party is entitled to receive, and only deliver information about the token holder (or a subset thereof) that the relying party is entitled to receive. The privacy of the rest of the information about the token holder is protected from being improperly disclosed to the relying party. Opaque identifiers can be made to be unlinkable to each other or to the token holder. Any suitable technology for performing these functions is encompassed by the present invention.

By use of the token, various relying parties can receive different sets of information which can be controlled for each by the registry. The registry can perform this function by correlating the RID (the reader identifier) for a relying party with one or more entries in an authorization database or other authority.

In yet another embodiment, a soft token can be used. The reader can be an application running on a computing device, such as a personal computer, a wireless handset, a game console, etc., (a "computing device.") In such an embodiment, the reader application can issue a challenge to a user, a user application, a component of the operating system, etc., (a "soft token.") The reader application can receive a response from the soft token, and the reader application can send a request for information to a registry, where the request can be based upon the response received from the soft token.

While various embodiments have been chosen to illustrate the invention, it will be understood by those skilled in the art that various changes and modifications can be made therein without departing from the scope of the invention as defined in the appended claims.

What is claimed is:

1. A method for sending an un-linkable identifier from a token, comprising:
   sending a Challenge message to a token, wherein the Challenge={Rnonce, RID}, where Rnonce is a reader nonce and RID is a reader identifier; and
   responsive to the challenge message, receiving a Response message, wherein the Response={signature(H(Tnonce, Rnonce, RID)), Tnonce, XID}, where signature is a digital signature using a private key of the token, H is a hash function, Tnonce is a token nonce and XID is an unlinkable identifier of the token.

2. The method of claim 1, wherein the XID={E (k, P), E (TID, k)}, where TID is a token identifier, k is a session key, P is a public key of the registry, E(TID,k) is the TID encrypted using the session key k, and E(k,P) is the session key k encrypted using the public key P.

3. The method of claim 2, further including sending the response message to a registry.

4. The method of claim 3, further including decrypting the session key k at the registry using a registry private key Q and decrypting the TID using the decrypted session key k.

5. The method of claim 4, further including using a key based upon the decrypted TID in a database query to obtain information registered to the TID.

6. The method of claim 3, wherein the message sent to the registry further includes {Rnonce, RID}.

7. The method of claim 6, further including verifying the RID by checking signature (H(Tnonce, Rnonce, RID)).

8. The method of claim 7, further comprising using a key based upon the verified RID as in a database query to determine which information corresponding to the TID a relying party is authorized to receive.

9. The method of claim 1, wherein the response includes a one-time password (OTP).

10. The method of claim 1, wherein the response includes biometric data.

11. A method for sending an un-linkable identifier from a token, comprising:
    sending a Challenge message to a token, wherein the Challenge={Rnonce, RID}, where Rnonce is a reader nonce and RID is a reader identifier;
    responsive to the challenge message, sending a Response message including at least an encrypted private token identifier TID and a session key;
    verifying the RID; and
    querying a database using a key based on the verified RID to identify information corresponding to the TID that a relying third party is authorized to receive.

12. The method of claim 11, further including sending the response message to a registry.

13. The method of claim 12, further including decrypting the session key k at the registry using a registry private key Q and decrypting the TID using the decrypted session key k.

14. The method of claim 13, further including using a key based upon the decrypted TID in a database query to obtain information registered to the TID.

15. The method of claim 12, wherein the message sent to the registry further includes {Rnonce, RID}.

16. The method of claim 11, wherein the response includes a one-time password (OTP).

17. The method of claim 11, wherein the response includes biometric data.

18. A method for providing information about a token holder to a relying party, comprising:
    receiving a token of the token holder at a reader of the relying party;
    sending a challenge message to the token, the challenge message including an attribute list identifying at least one attribute of the token holder requested by the relying party;
    receiving from the token a response including an un-linkable identifier;

sending a request to an identity registry distinct from the relying party and from the token holder, the request including the token response and the attribute list; and receiving a registry response from the identity registry, the registry response including at least one of:
- the at least one attribute;
- an error message;
- an indication that the at least one attribute is not available; and
- an indication that the relying party is not authorized to access the at least one attribute.

19. The method of claim 18, wherein the un-linkable identifier is generated from a combination of:
- a token identifier encrypted with a session key; and
- the session key encrypted with a public key of the identity registry.

20. The method of claim 18, wherein the token is an identification card.

* * * * *